United States Patent
O'Driscoll et al.

(10) Patent No.: US 11,588,867 B2
(45) Date of Patent: *Feb. 21, 2023

(54) SYSTEM AND METHOD FOR GENERATING DYNAMIC PLAYLISTS UTILISING DEVICE CO-PRESENCE PROXIMITY

(71) Applicant: Spotify AB, Stockholm (SE)

(72) Inventors: Brendan O'Driscoll, Dublin (IE); Craig Watson, Dublin (IE); Aidan Sliney, Dublin (IE); Brian Boyle, Dublin (IE); Dave Lynch, Dublin (IE); Lucas M. Braz, Dublin (IE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,644

(22) Filed: May 20, 2020

(65) Prior Publication Data

US 2020/0287948 A1 Sep. 10, 2020

Related U.S. Application Data

(63) Continuation of application No. 15/087,448, filed on Mar. 31, 2016, now abandoned.
(Continued)

(51) Int. Cl.
*H04W 4/02* (2018.01)
*H04L 65/61* (2022.01)
(Continued)

(52) U.S. Cl.
CPC .............. *H04L 65/61* (2022.05); *G06F 16/40* (2019.01); *G06F 16/4387* (2019.01);
(Continued)

(58) Field of Classification Search
CPC ......... H04N 21/26258; H04N 21/4524; H04N 21/4532; G06F 17/30017; G06F 17/30772; G06F 17/30038
See application file for complete search history.

(56) References Cited

U.S. PATENT DOCUMENTS 9,112,849 B1 8/2015 Werkelin Ahlin et al.
2007/0100481 A1 5/2007 Toms et al.
(Continued)

FOREIGN PATENT DOCUMENTS

EP 3554091 A1 10/2019

OTHER PUBLICATIONS

Broberg, Final Office Action, U.S. Appl. No. 16/868,404, dated Aug. 5, 2021, 12 pgs.
(Continued)

*Primary Examiner* — Hitesh Patel
(74) *Attorney, Agent, or Firm* — Morgan, Lewis & Bockius LLP

(57) ABSTRACT

A system and method for generating dynamic playlists utilizing device co-presence proximity. In accordance with an embodiment, the method can include identifying music preferences by analyzing the listening history on a device of a user; and recognizing what devices are co-present within a set proximity for the purposes of matching such devices. In accordance with an embodiment, the system can be determine what music each individual in a group has been listening to historically, and determine when those individuals are within a certain proximity to one another, including for example analyzing the media content played on a smartphone and recognising when two smartphones are in a same location.

15 Claims, 13 Drawing Sheets

HOUSE PARTY EXAMPLE

Related U.S. Application Data

(60) Provisional application No. 62/141,396, filed on Apr. 1, 2015.

(51) Int. Cl.

| | | |
|---|---|---|
| *G06F 16/40* | (2019.01) | |
| *G06F 16/438* | (2019.01) | |
| *H04L 67/50* | (2022.01) | |
| *H04W 52/02* | (2009.01) | |

(52) U.S. Cl.
CPC ........... *H04L 67/535* (2022.05); *H04W 4/023* (2013.01); *H04W 52/0209* (2013.01); *Y02D 30/70* (2020.08)

(56) References Cited

U.S. PATENT DOCUMENTS

| | | | |
|---|---|---|---|
| 2008/0166967 A1* | 7/2008 | McKillop | H04W 52/50 455/41.2 |
| 2010/0044121 A1 | 2/2010 | Simon et al. | |
| 2011/0004330 A1 | 1/2011 | Rothkopf et al. | |
| 2012/0290653 A1* | 11/2012 | Sharkey | H04W 4/023 709/204 |
| 2014/0028784 A1 | 1/2014 | Deyerle et al. | |
| 2014/0031961 A1* | 1/2014 | Wansley | H04W 4/021 700/94 |
| 2014/0108946 A1 | 4/2014 | Olofsson | |
| 2015/0249857 A1 | 9/2015 | Dion et al. | |
| 2015/0277852 A1* | 10/2015 | Burgis | G06F 16/637 700/94 |
| 2015/0355879 A1 | 12/2015 | Beckhardt et al. | |
| 2016/0007079 A1 | 1/2016 | Vega-Zayas et al. | |
| 2016/0080473 A1 | 3/2016 | Coburn, IV | |
| 2016/0085499 A1 | 3/2016 | Corbin et al. | |
| 2016/0277802 A1 | 9/2016 | Bernstein et al. | |
| 2017/0093769 A1 | 3/2017 | Lind et al. | |
| 2017/0103075 A1 | 4/2017 | Toumpelis | |
| 2017/0171898 A1* | 6/2017 | Jamal-Syed | H04W 4/80 |
| 2019/0018644 A1 | 1/2019 | Kovacevic et al. | |
| 2019/0121823 A1 | 4/2019 | Miyazaki et al. | |
| 2019/0361572 A1* | 11/2019 | Webber | G06F 9/451 |
| 2019/0370280 A1 | 12/2019 | Shenoy et al. | |

OTHER PUBLICATIONS

Patricks, Notice of Allowance, U.S. Appl. No. 16/903,085, dated Jul. 23, 2021, 5 pgs.
Patricks, Office Action, U.S. Appl. No. 16/903,078, dated Sep. 10, 2021, 20 pgs.
Spotify AB, Extended European Search Report, EP21165870.3, dated Jun. 8, 2021, 7 pgs.
Hemejarvi, Office Action, U.S. Appl. No. 17/362,508, dated May 9, 2022, 13 pgs.
Patricks, Final Office Action, U.S. Appl. No. 16/903,078, dated Mar. 28, 2022, 27 pgs.
Hemejarvi, Notice of Allowance, U.S. Appl. No. 16/784,090, dated Mar. 31, 2021, 5 pgs.
Patricks, Office Action, U.S. Appl. No. 16/903,085, dated Mar. 29, 2021, 8 pgs.
Broberg, Notice of Allowance, U.S. Appl. No. 16/868,404, dated Nov. 19, 2021, 7 pgs.

\* cited by examiner

Mobile uses wireless communication to become aware of other nearby mobile devices Mobiles uses wireless local area network to become aware of other nearby mobile devices

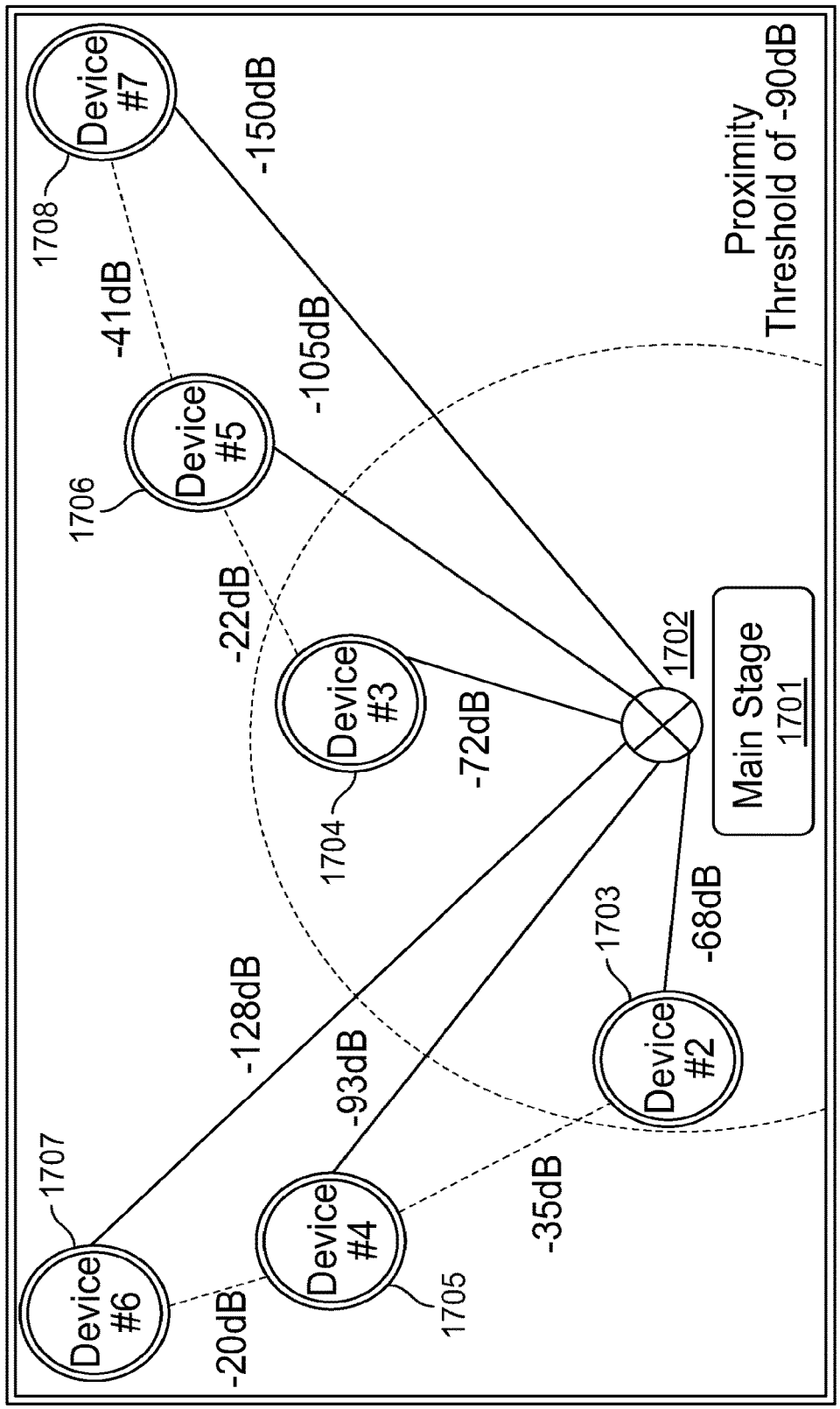

SYSTEM AND METHOD FOR GENERATING DYNAMIC PLAYLISTS UTILISING DEVICE CO-PRESENCE PROXIMITY

RELATED APPLICATIONS

This application is a continuation application of U.S. patent application Ser. No. 15/087,448, titled "System and method for generating dynamic playlists utilising device co-presence proximity", filed Mar. 31, 2016, which claims the benefit of priority to U.S. Provisional Patent Application No. 62/141,396, titled "System and method for generating dynamic playlists utilising device co-presence proximity", filed Apr. 1, 2015, each of which is herein incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates generally to a method, system and apparatus for the generation of dynamic playlists by understanding what media content has been played by one or more users.

DESCRIPTION OF RELATED ART

There are currently more than 2 billion smartphone devices in the world. These smartphones perform many of the functions of a computer, typically having a touchscreen interface, Internet access, and an operating system capable of running downloaded apps.

A movement towards the increased portability of media has followed this technical advancement through the benefits of the client to server relationship on which these electronic devices operate. This means that media, and music specifically, can be accessed by smartphone owners on demand and in a number of different ways. For example, music can be consumed by listening to local MP3 files on the phone itself or through access to the Internet or through dedicated apps on the phone.

In addition, the rise of on demand music streaming services with their vast catalogues of millions of songs means that ownership of a physical music file or a digital music file is no longer required to enjoy music. The state of the art allows subscribers to access this content whenever and wherever they want on their smartphones through any number of free or paid subscription services. The net result is that it has never been easier to listen to music on the go either in an individual or group capacity.

The existence of all this easily accessible content has led to consumers now facing an overwhelming song choice as there are often over 20 million tracks available on most of the established content providers. In order to combat this 'search bar paralysis' when looking for music, a number of services have introduced dedicated playlist functionality to allow consumers to sort and make sense of these vast databases of music.

The curation of music into playlists or other queues of specific songs is well established but this was often driven by a limitation of access to content as opposed to consumers having too much choice. By way of example, when CDs were the state of the art, it was common that CDs were played during a party to entertain the guests. However, such party-goers could only listen to the music that was physically present at that party. Other listeners would have to bring their own CDs to the party if they wanted to extend the scope of the music listened to or if they simply wanted to demonstrate their music preferences. Such limitations prohibited the communal enjoyment of music.

With the advent of the Internet and digital music in general, this limitation was removed for the first time and synchronous music listening was no longer limited to the content physically present at any one location. To take the example of a house party again, party-goers would often take turns in choosing the music that was being played on a desktop computer or laptop from a much broader catalogue of music. Despite these advancements, this process was relatively manual and required the primary music player (desktop computer or laptop) to be controlled by one person at a time.

Another limitation of this approach was that the music played was typically dictated by the person who was in control of the primary music player at the party. Without knowing what the preferred music tastes were of the other party-goers the controller of the primary music player had no way of understanding what the most popular choice of music would be for that particular environment. It was also difficult therefore to queue songs and create playlists of music that would be enjoyed by a group as a whole. This is especially true the larger the group in question. It is next to impossible for example to work out what the musical preferences for a nightclub crowd would be even though this would be highly valuable for any DJ at that night club. Equally, at larger music festivals it is very difficult without resorting to manual processes to poll the attendees to find out what their music listening preferences are.

Arguably, the only place where this type of group curation worked synchronously was in virtual online music rooms such as Turntable.fm. The reason this platform worked (growing to a registration base of 40 million users) was that it combined instant music streaming with chat rooms and a voting system. In sum, it provided the content, the social dialogue around the music being played and the ability for listeners to up-vote or down-vote the song being listened to. Turntable.fm therefore solved some of the problems of listening to music synchronously because users were able to access listening histories, preferences and real-time reactions to adapt the music that was being played on the service to better suit the group that were consuming the music.

Other services tried to meet the desired listening preferences of a group by using an asynchronous approach. Instead of requiring users to listen to the same music at the same time, services like Spotify encouraged collaboration around playlists that could then be listened to by an individual or a group at a later point of time. By representing individual tastes in a collaborative manner, it was hoped that this asynchronous approach could solve the above-mentioned problems associated with enjoying music in a group. Namely the control issue where one party-goer had to rely on a best guess to play the right music for that environment and to suit the tastes of all participants. The preloaded playlist could then be enjoyed in a synchronous manner by the contributors to the playlist when they were next together in a group.

With the widespread adoption of smartphones, there should be a way for groups of people to enjoy music together by combining the advantages of easily accessed content with a better understanding of music preferences. In addition this solution should be automated and not reliant on manual user input on demand. It is an object therefore to provide a solution for a system and method for generating dynamic playlists.

SUMMARY

According to the invention there is provided, as set out in the appended claims, a system and method for generating dynamic playlists utilising device co-presence proximity.

The invention specifically targets this problem by understanding what music each individual in a group has been listening to historically and then working out when those individuals are within a certain proximity to one another. This is achieved by analysing the media content played on a smartphone and by recognising when two smartphones are in the same location.

To take the example of the house party again, this solution does not require any manual input, social dialogue or voting system to work out the aggregated tastes of a group. Instead when a playlist is generated by any party-goer, the queue of songs to be played will update automatically when new people enter the room. This removes any friction in choosing what song to play next and eradicates the guesswork involved in trying to work out the best music to play for that particular environment.

The present invention is an improvement over conventional systems in that method and apparatus for the generation of dynamic playlists by understanding what media content has been played by a listener and then merging this media content utilising co-presence proximity between two or more electronic devices. This invention is both unique and an improvement over the prior art.

It is therefore an object of the present invention to provide a new and improved method and apparatus for the generation of playlists in an automated and efficient manner when in a group.

It is another object of the present invention to provide a new and improved music or other audio metadata identification system and method in respect of music or other media played on a smartphone to understand the listening preferences of a user.

It is another object of the present invention to provide a new and improved device co-presence recognition system at the operating system level on smartphones.

It is another object of the present invention to provide a new and improved device co-presence recognition system and method that is capable of working with real-time GPS location-based systems as well as pre-loaded mapping software on smartphones.

It is another object of the present invention to provide a new and improved device co-presence recognition system and method that is capable of working with Bluetooth wireless technology.

It is another object of the present invention to provide a new and improved device co-presence recognition system and method that is capable of working with temporal-based systems so that such information is filterable by time.

It is another object of the present invention to provide a new and improved device co-presence recognition system and method that is capable of being used by app developers to provide users with the ability to generate music playlists and other audio metadata on other online platforms.

Other objects, features and advantages of the invention will be apparent from the following detailed disclosure, taken in conjunction with the accompanying sheets of drawings, wherein like reference numerals refer to like parts.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:

FIG. 17 is a diagram of device co-present proximity in operation at a music festival to generate dynamic playlists.

DETAILED DESCRIPTION

Figure 1:
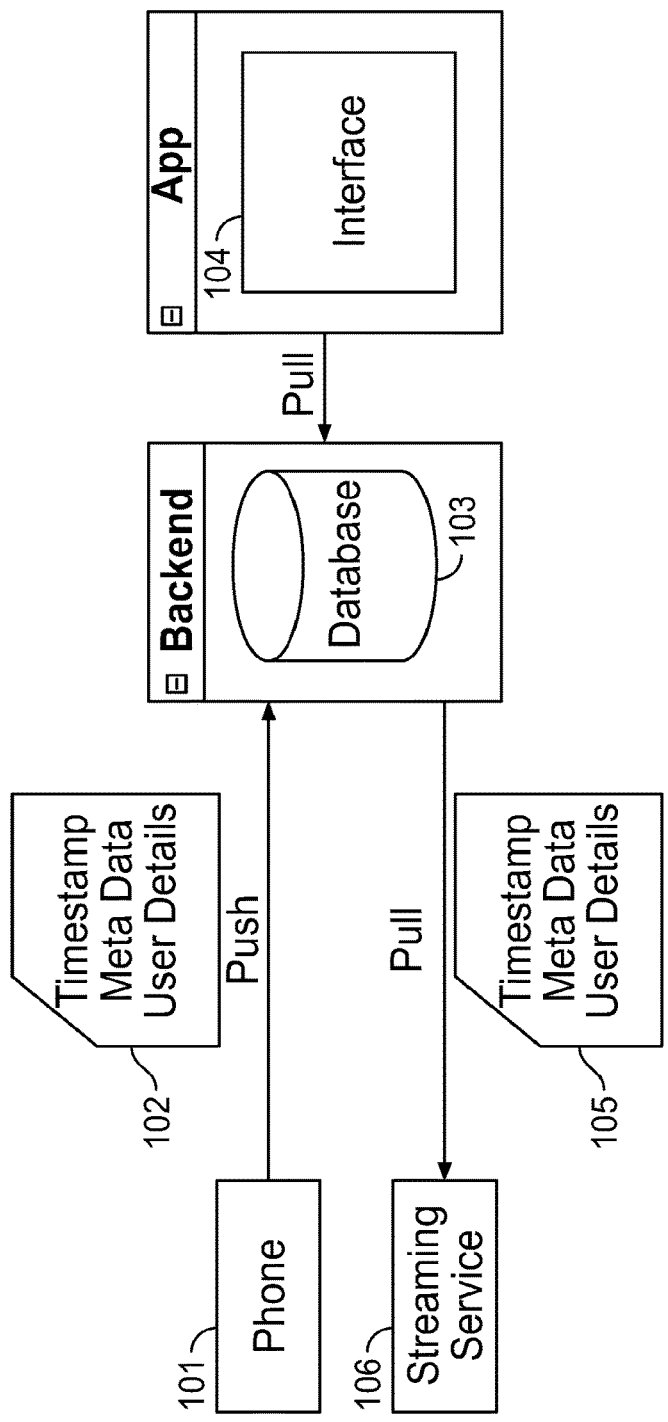
FIG. 1 is a diagram of a system for identifying music or other audio metadata on a mobile device.

A method and apparatus for the identification of music or other audio metadata played on an iOS device, and more particularly, in relation to audio files that are played through the native iPod application on iOS devices.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Although several embodiments of the invention are discussed with respect to music or other audio metadata on iOS devices, in communication with a network, it is recognized by one of ordinary skill in the art that the embodiments of the inventions have applicability to any type of content playback (e.g., video, books, games) involving any device (wired and wireless local devices or both local and remote wired or wireless devices) capable of playing content that can be identified, or capable of communication with such a device.

FIG. 1 is a diagram of a system for identifying played content on a mobile device, according to one embodiment. By way of example, the communication between push of location, timestamp, metadata and user details at 102 between the device 101 and the backend 103 and the communication between the pull of location, timestamp, metadata and user details at 105 between the backend 103 and the content provider 105 can include one or more networks such as a data network (not shown), a wireless network (not shown), a telephony network (not shown) or any combination thereof.

The system set out in FIG. 1 included a music identification and classification service 101, 102, 105 and 106 and a database interface process 103. The system includes instructions for finding metadata about music or other audio files. The database interface process 103 is the interface between the device 101 and the content database 106, and is used to retrieve and store metadata, and to retrieve and store content.

In the illustrated embodiment, the services include played content identification process 102 and 105 to identify played music or other audio metadata and to use the database interface process 103 to store and retrieve the event data that describes what is being played, where it being played and when.

In circumstances where the music or audio metadata is not stored on the device 101, and pushed 102 to the database 103, often a Content Distribution Network (CDN) as embodied in 106 is the source of the music or audio metadata. Typically, the music store authorizes the CDN to download the client and then directs a link on the user's browser client to request the content from the CDN. The content is delivered to the user through the user's browser client as data formatted, for example, according to HTTP or the real-time messaging protocol (RTMP). As a result, the content is stored as local content 106 on the user's device 101. The local content arrives on the device either directly from the CDN or indirectly through some other device (e.g., a wired note like other host) using a temporary connection (not shown) between mobile terminal for example and other host.

Once this information has been added to the database 103 and stored locally, the application itself 104 on a user's mobile device can then be used to access and retrieve the music or other audio metadata. Depending on the availability of the metadata, user details and timestamp, an app developer can therefore use the present invention to distinguish what music or other audio file was played, when it was played and by whom.

Figure 2:
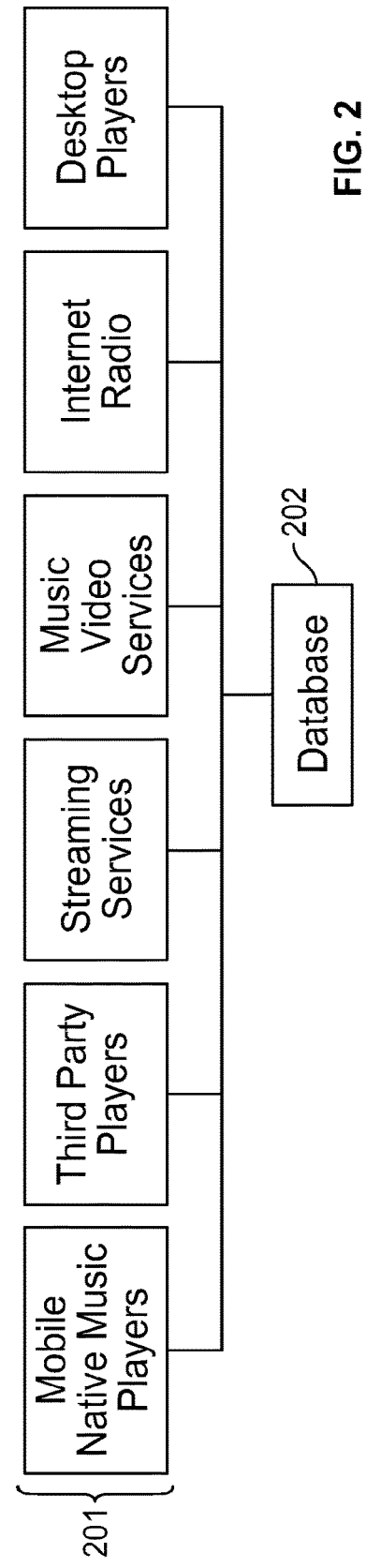
FIG. 2 is an example of the various music sources that can be analysed to understand listening preferences.

FIG. 2 is a diagram outlining some of the various sources of music consumption 201, including but not limited to mobile native music players, third party players, streaming services, music video services, internet radio and desktop players. The music can be identified from one or a combination of these sources to understand what their music listening history is for a particular user. This information can then be sent to a database 202 to be stored for future reference.

In addition to embodiments set out in FIGS. 1 and 2, which a third party app developer could use, first party services will have their own music identification process to understand what music has been played, when it was played and by whom. For example, Apple will know what songs are listened to by a user on iTunes (e.g., on their own particular service) and will not need to push this information from the mobile client or pull it from the service separately into a database. The present invention caters for such an embodiment.

Figure 3:
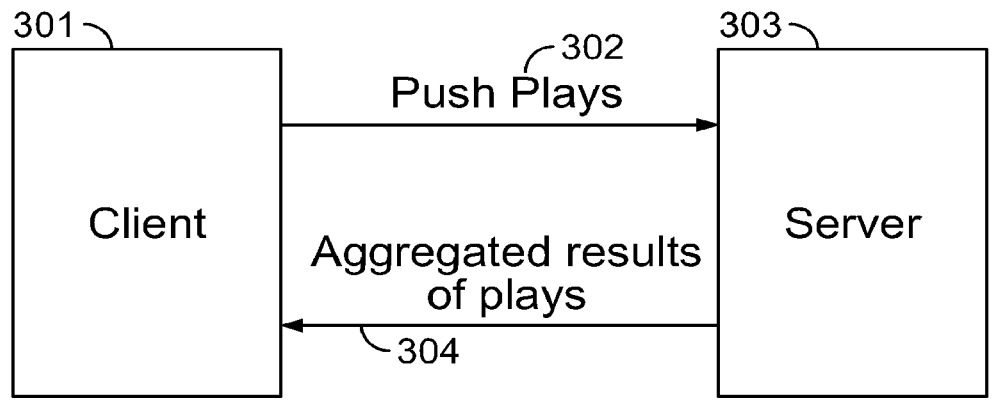
FIG. 3 is a diagram of the server to client interaction that is used to implement an embodiment of the invention.

FIG. 3 is a diagram of the server to client interaction that is used to implement an embodiment of the invention. The client-server model of computer process interaction is widely known and used. According to the client-server model, a client process 301 sends a message including a request to a server process 303, and the server process responds by providing a service. The server process 303 may also return a message with a response to the client process 301. Often the client process and server process 303 execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" 301 and "server" 303 refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In this case, the client 301 pushes plays 302 to the server 303 which then returns the aggregated results of the plays 304 back to the client 301.

Figure 4:
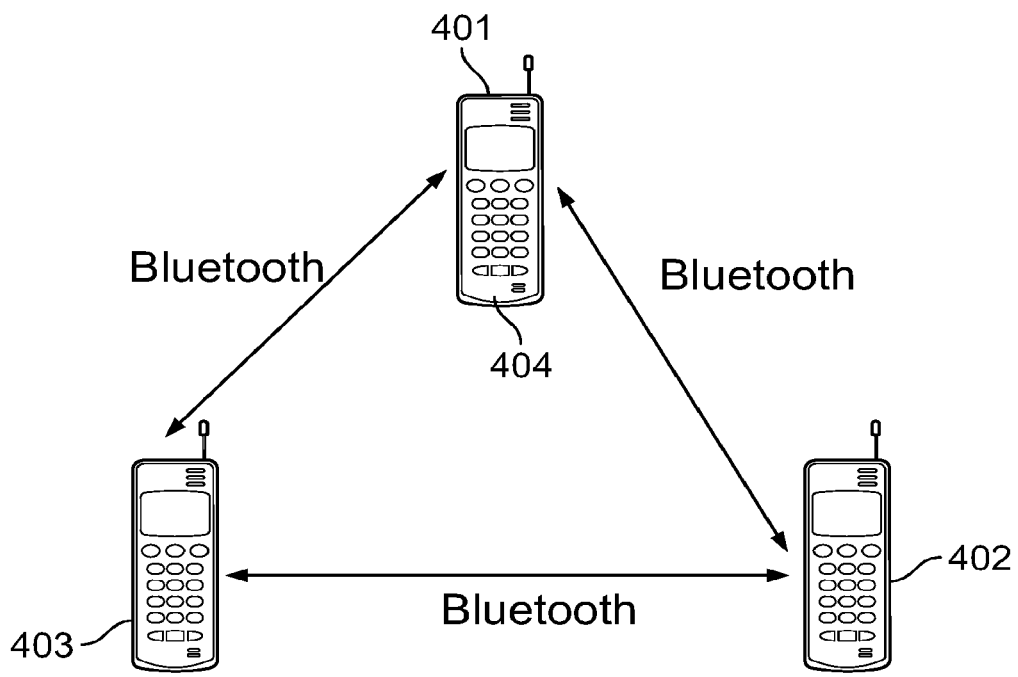
FIG. 4 is a first way that a mobile communication device 1 can become aware of other nearby mobile communication devices.
Figure 5:
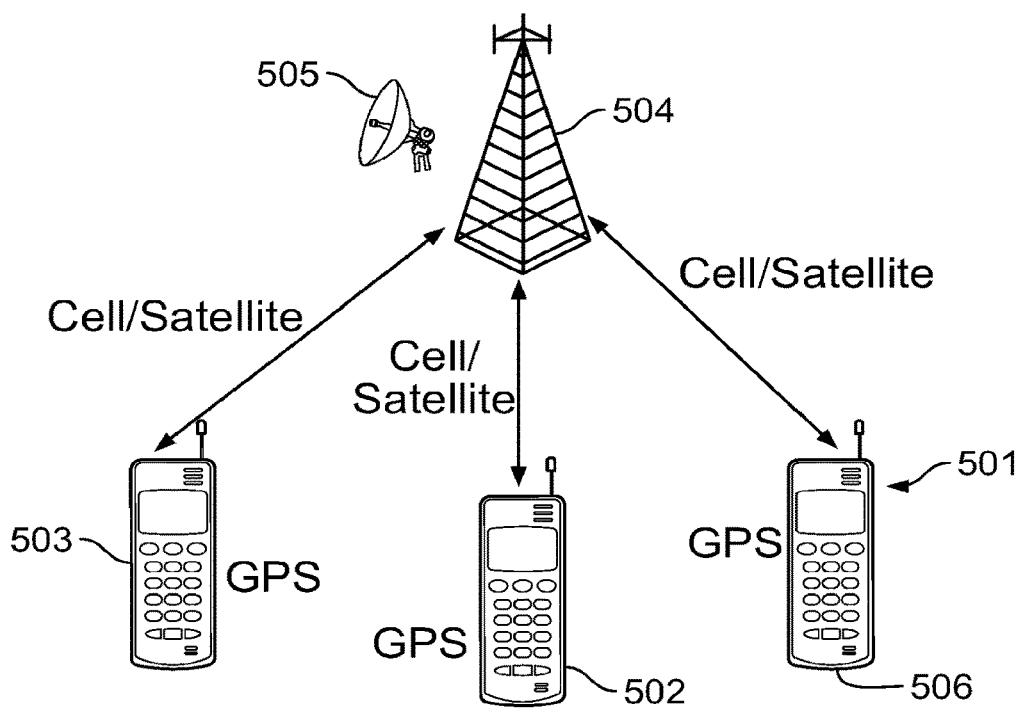
FIG. 5 is a second way that a mobile communication device 1 can become aware of other nearby mobile communication devices.
Figure 6:
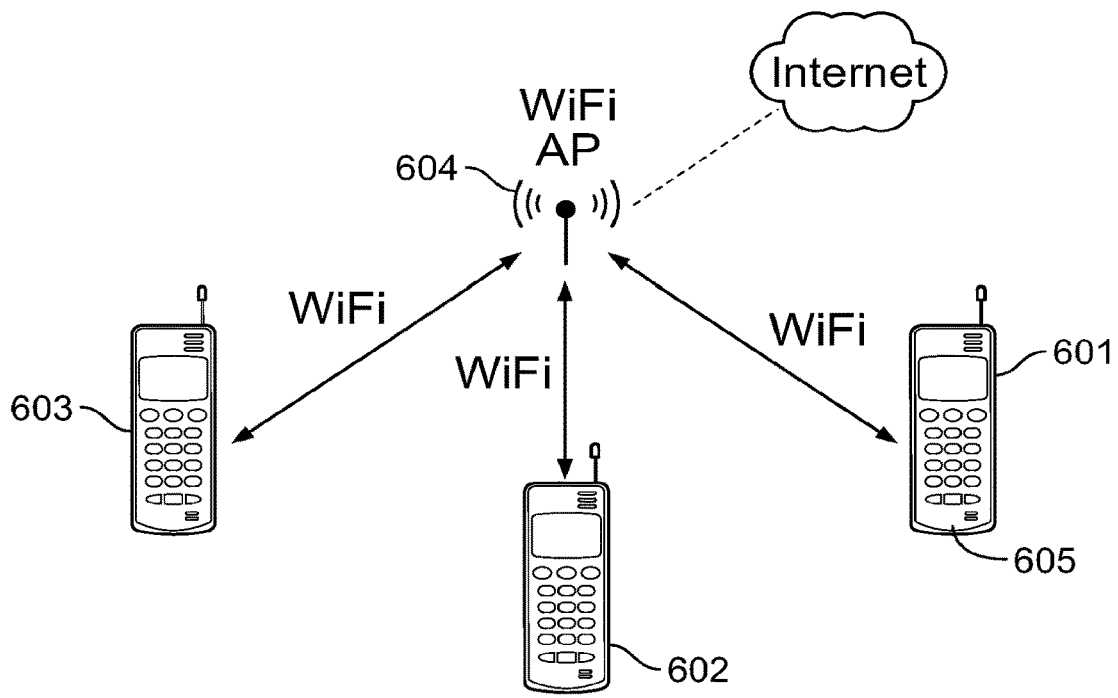
FIG. 6 is a third way that a mobile communication device 1 can become aware of other nearby mobile communication devices.

FIGS. 4, 5 and 6 show three ways that a first mobile communication device 401, in accordance with one novel aspect, can become aware of second mobile communication devices 402 and 403 located nearby the first mobile communication device 401.

FIG. 4 illustrates how first mobile communication device 401 detects nearby second mobile communications devices 402 and 403 using Bluetooth communications. Each mobile communication device has a Bluetooth transceiver and communication functionality. Block 404 represents the Bluetooth communication functionality 404 within first mobile communication device 401. When device 401 enters the Bluetooth communication range of devices 402 and 403, periodic device inquiry broadcasts by device 401 are received by the other devices 402 and 403. Each other device responds to such a device inquiry by sending back a response. The response contains position information indicative of the position of the originator of the response. The response also contains an identifier that uniquely identifies the originator. In this way, a mobile communication device 401 that has a Bluetooth communication functionality can become aware of the presence of other nearby Bluetooth-enabled mobile communication devices 402 and 403. Whether or not the devices 402 and 403 are determined to be nearby (or in the "presence of") mobile communication device 401 is determined by whether or not Bluetooth communication can be established between the devices. If Bluetooth communication can be established, then it is determined that the second mobile communication device must be nearby the first mobile communication device. If Bluetooth communication cannot be established, then it is determined that the second mobile communication device is not nearby the first mobile communication device.

It should also be noted that the present invention utilises the latest technologies in mesh networks to ensure that devices that might be out of range directly with one another can still be 'paired' to a master device. A mesh network has a topology whereby all devices can communicate with all other devices in the network, either directly if in range, or indirectly via one or more intermediate "nodes" if they are not. This is in contrast to other network types that often feature a central hub like a router, through which all traffic must flow. Mesh networks have no such central hub and offer multiple ways of getting data from one device to another. This makes for an inherently reliable network design. It will be explained in FIG. 16 how such a mesh network might operate in order to match numerous co-present devices in order to generate a dynamic playlist.

FIG. 5 illustrates another way that first mobile communication device 501 can become aware of other nearby second mobile communication devices 502 and 503. In the example of FIG. 5, each mobile communication device is a cellular telephone that has a Global Positioning System (GPS) functionality. The GPS functionality of first mobile communication device 501 is identified by reference numeral 506. Each cellular telephone reports its location, as determined by its GPS functionality, via a cellular telephone communication link to a base station 504 of the cellular telephone network or through a GPS satellite 505. The locations of mobile communication devices 502 and 503 are then relayed via the cellular telephone network to mobile communication device 501. Mobile communication device 501 is aware of its own location by virtue of information generated by its own GPS functionality 506. First mobile communication device 501 can therefore compare the GPS location information of all the devices 501-503 to determine that devices 502 and 503 are nearby (in the "presence of") device 501.

FIG. 6 illustrates another way that first mobile communication device 601 can become aware of other nearby second mobile communication devices 602 and 603. In the example of FIG. 6, each mobile communication device is a cellular telephone that has a wireless LAN (Local Area Network) functionality by which it can communicate with an Access Point 604 of the wireless LAN. The wireless LAN functionality of first mobile communication device 601 is represented by reference numeral 605. Mobile communication device 601 is aware that it is close to Access Point 604 by virtue of its being in RF communication with Access Point 604. Similarly, mobile communication devices 602 and 603 also are aware that they are close to Access Point 604 because they are in RF communication with Access Point 604. Devices 602 and 603 communicate their locations via Access Point 604 to first mobile communication device 601. In addition, the use of WiFi fingerprinting can be utilised to work out if mobile devices are nearby to one another. For example, if it is known what WiFi networks are near first mobile device 601 and what WiFi networks are near second mobile device 602 then if there is significant overlap between the two, it can be determined that first mobile device 601 and second mobile device 602 are near to one another. This is helpful in situations where there is no connection to a local access point. These are just a couple of examples on how a local area network and WiFi signal can be used to determine device proximity.

Figure 7:
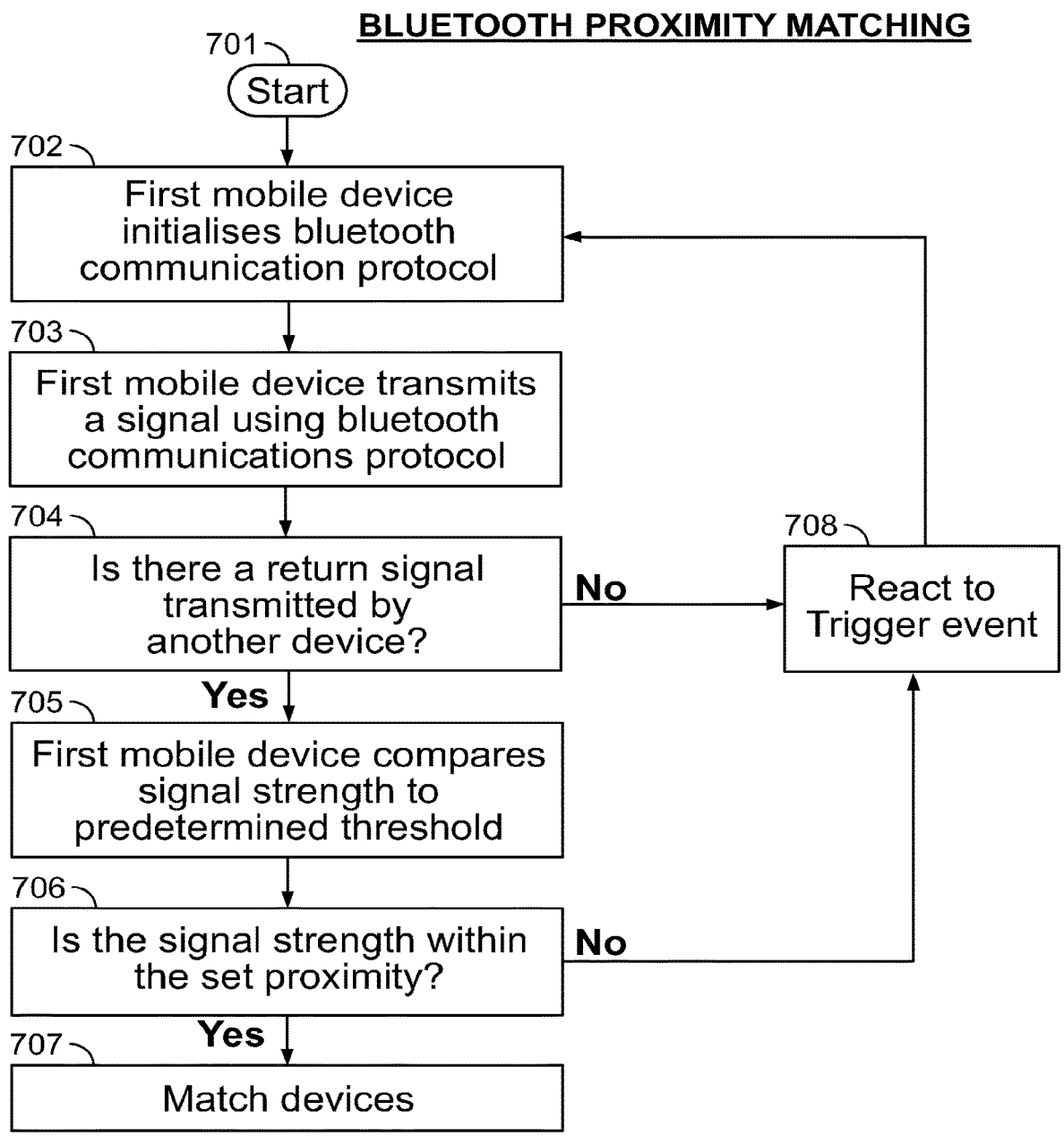
FIG. 7 is a schematic view of how the invention uses Bluetooth proximity matching to work out what devices are nearby.

FIG. 7 is a schematic view of how the invention uses Bluetooth proximity matching to work out what devices are nearby. In this embodiment, the execution starts 701 when the first mobile device initialises a Bluetooth communication protocol 702. The First mobile device then transmits a signal using the Bluetooth communication protocol 703. If a return signal is transmitted by another device 704 then the first mobile device compares the signal strength to the predetermined threshold 705. If no return signal is transmitted by another device 704 then the execution stops until there is trigger event which causes the first mobile device to react 708. Such a trigger may include a time delay or any such other arbitrary trigger event as chosen. If there is a return signal transmitted by another device 704 and the first mobile device has compared the signal strength to the predetermined threshold 706, it will then be confirmed if the signal strength is within the set proximity 706. If it is, then the devices will be matched 707. If it is not, then the execution will be stopped until some subsequent trigger event activates the process all over again 708. It should be noted that the invention includes a number of optimisations that help with battery life using the latest technological improvements available through Bluetooth low energy (BLE). By adhering to these latest developments, we can ensure that we only check for Bluetooth proximity matching as and when required. By including these engineering constraints we can ensure that the overall user experience is a positive one as the draining of battery for background tasks such as this is not intended nor desired.

Figure 8:
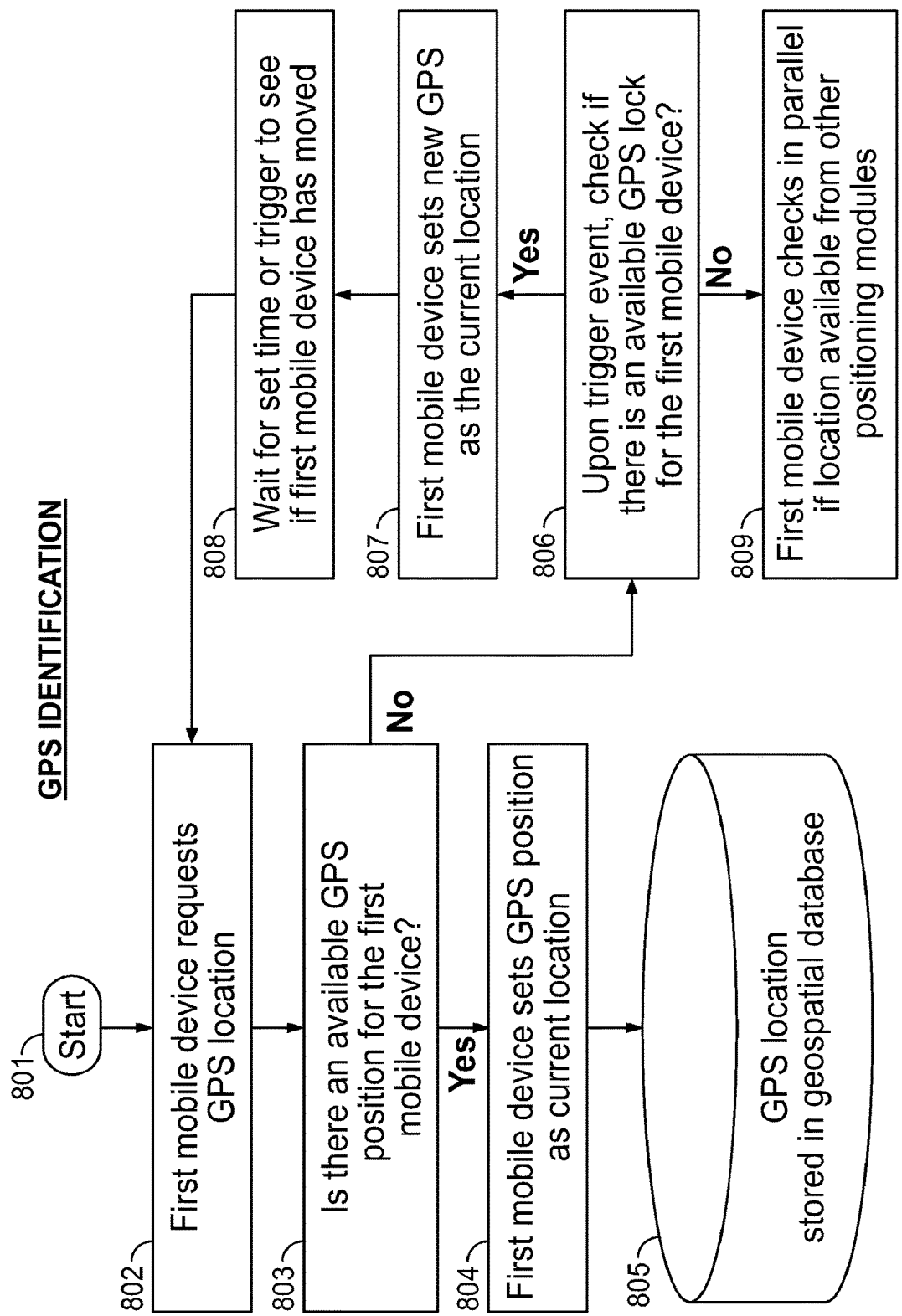
FIG. 8 is a schematic view which explains how the GPS identification works in the present invention.

FIG. 8 is a schematic view which explains how the GPS identification works in the present invention. In this embodiment, the execution starts 801 when the first mobile device requests the GPS location (using cellular networks and/or satellite as available) 802. If there is an available GPS position for the first mobile device 803 then the first mobile device sets the GPS position as the current location 804. This GPS location is then sent to the server and stored in a geospatial database 805. If there is not an available GPS position for the first mobile device 803 then upon a subsequent trigger event, it will be checked again whether or not this is an available GPS lock for the first mobile device 806. If there is then the first mobile device will set the new GPS position as the current location 807. The invention will then wait a set amount of time or for a triggered event to see if the device has moved 808 and the process will commence again with the first mobile device requesting the GPS location 802. If there is no available GPS lock for the first mobile device 806 then the first mobile device will check in parallel if location information is available from other positioning modules (e.g., Bluetooth or LAN).

Figure 9:
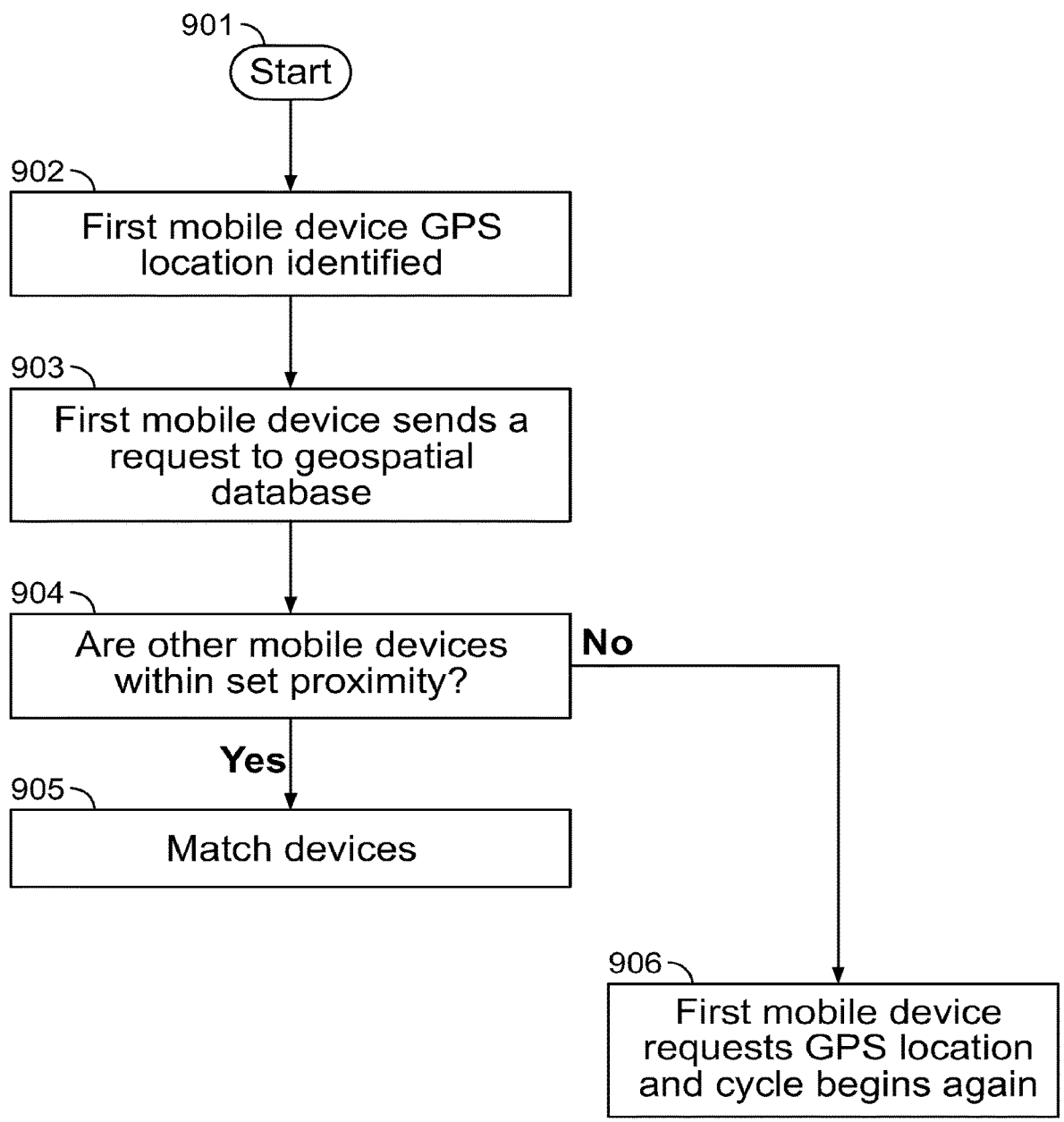
FIG. 9 is a schematic view of the GPS proximity matching method used.

FIG. 9 is a schematic view of the GPS proximity matching method used. In this embodiment, the execution starts 901 when the first mobile device GPS location is identified 902. The first mobile device then sends a request to the geospatial database 903 and checks if there are any other mobile devices within the set proximity 904. If there are then the system will match the devices 905. If there are no other devices within the set proximity then the first mobile device requests the GPS location and the cycle begins again 906 as outlined in more details in FIG. 8.

Figure 10:
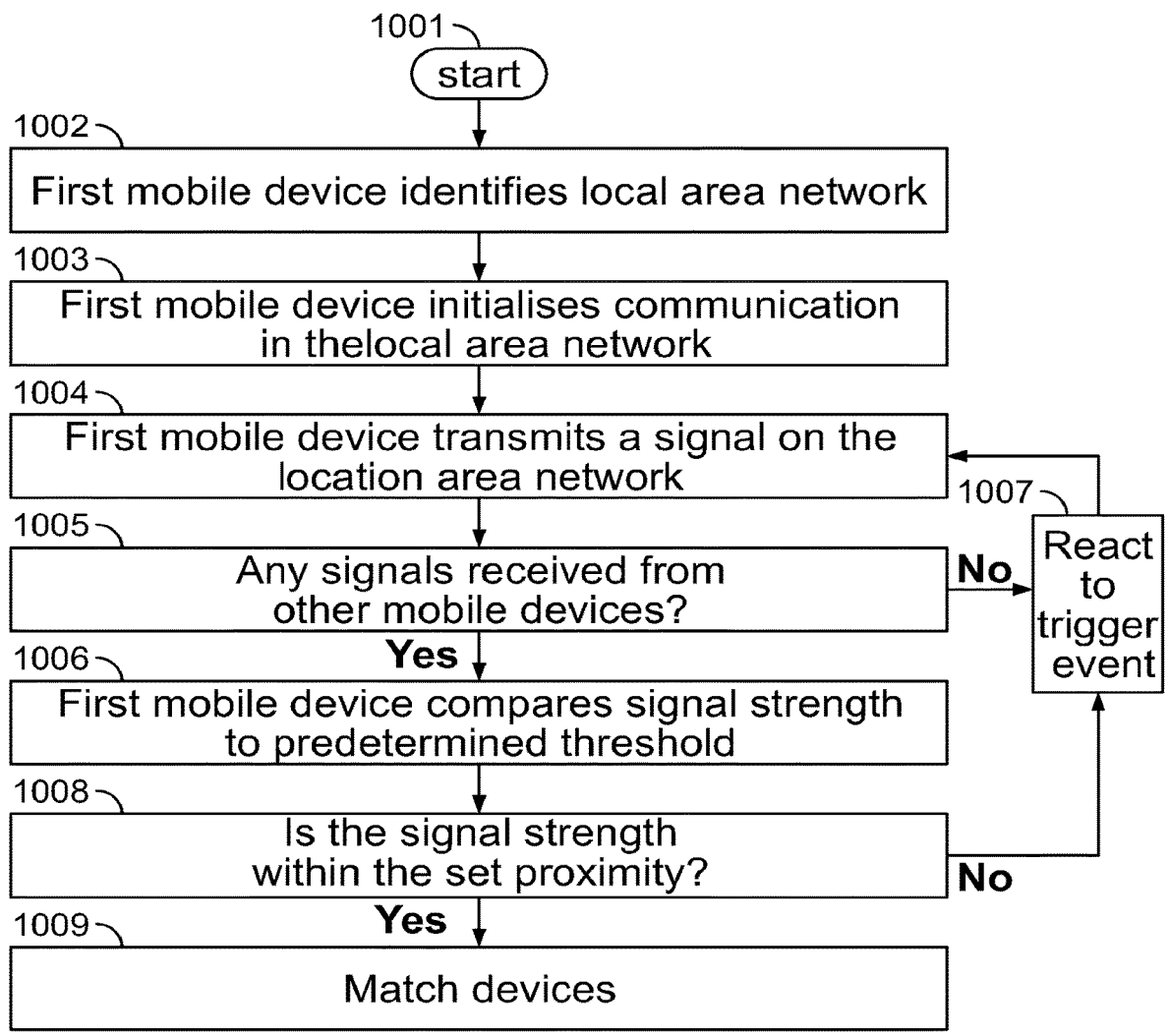
FIG. 10 is a schematic view of how the invention uses local area network proximity matching to work out what devices are nearby.

FIG. 10 is a schematic view of how the invention uses local area network proximity matching to work out what devices are nearby. In this embodiment, the execution starts 1001 when the first mobile device initialises a local area network (LAN) 1002. Once identified, the first mobile device initialises communication in the LAN 1003. Next, the first mobile device transmits a signal on the LAN 1004 and checks to see if any signals are received from other mobile devices on the LAN 1005. If no other signals are received then the execution stops and reactivates upon a trigger event 1007 and the process commences again with the first mobile device transmitting a signal on the LAN 1004. If a signal is received from another mobile device as queried at 1005 then the first mobile device compares signal strength to the predetermined threshold 1006. It then checks if the signal strength is within the set proximity 1008. If it is then the system will match the devices 1009. If the signal strength is not within the set proximity then the execution stops and reactivates upon a trigger event 1007 and the process commences again with the first mobile device transmitting a signal on the LAN 1004.

It should be noted that these are separate embodiments of the location modules working in isolation from one another. The invention utilises the best available location module (whether that is by GPS, LAN, Bluetooth or otherwise) for each particular scenario in order to match devices and to minimise the battery drain. Often these systems can be run in parallel and the optimisations occur in near real-time between the client and server depending on the specific use case.

Figure 11:
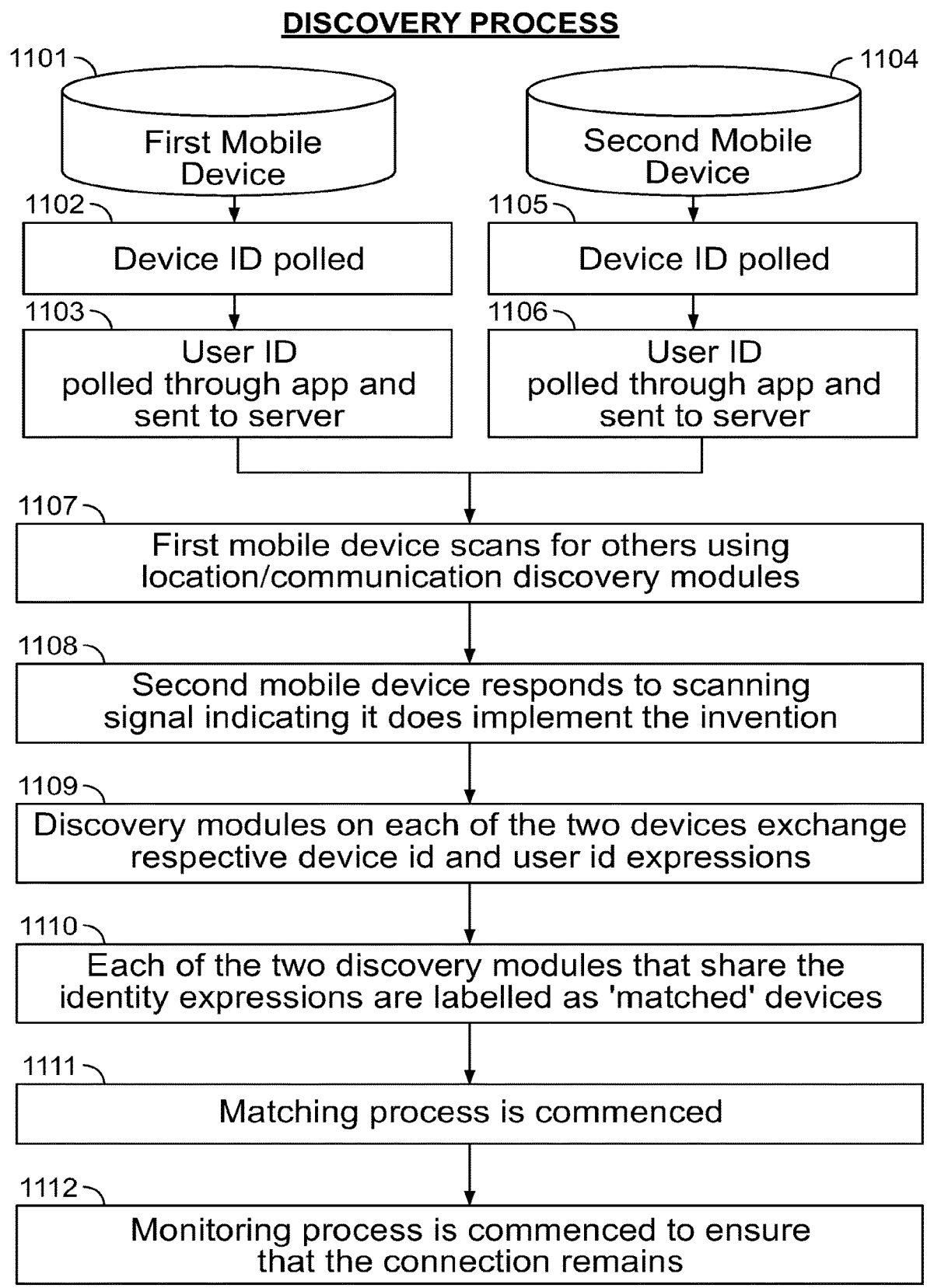
FIG. 11 is a schematic view of the discovery process working.

FIG. 11 is a schematic view of the discovery process working (agnostic to any particular location or communication protocol module). The first mobile device 1101 identifies the device ID 1102. The User ID is then polled through the app and sent to the server 1103. Separately, the second mobile device 1104 identifies the device ID 1105. The User ID of the second mobile device is then polled through the app and sent to the server 1106. Once the IDs have been identified, the first mobile device scans for others using the best location discovery module 1107 for that particular situation. The second mobile device responds to the scanning signal indicating that in this case it does implement the current invention 1108. The discovery modules on each of the two devices then exchange their respective device ID and User ID expressions 1109. Each of the two discovery modules that share the identity expressions are then labelled as 'matched' devices 1110 and the matching process is commenced 1111 which is further described in FIG. 13. To ensure that the devices remain connected, a monitoring process is then commenced 1112 as further outlined in FIG. 12.

Figure 12:
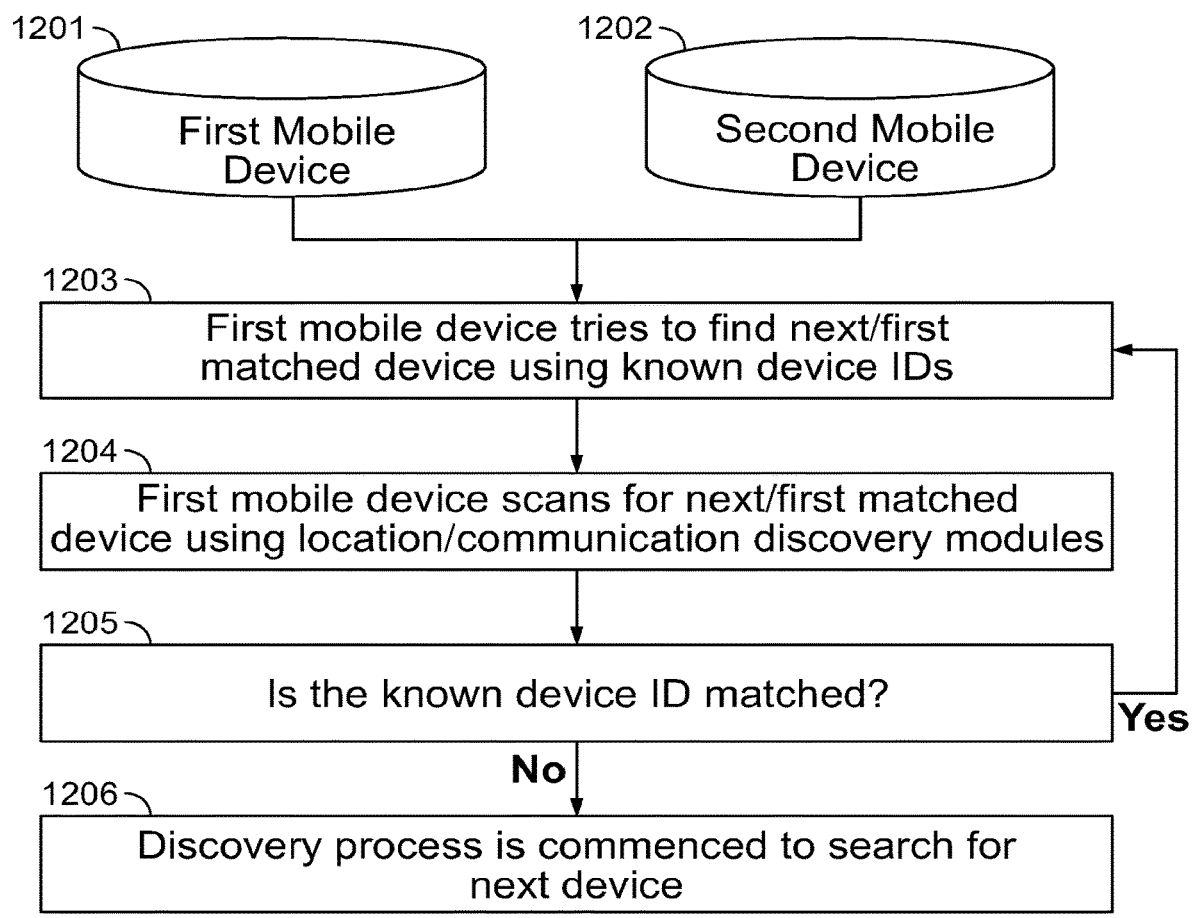
FIG. 12 is a schematic view of the monitoring process working.

FIG. 12 is a schematic view of the monitoring process working (agnostic to any particular location or communication protocol module). The first mobile device 1201 and the second mobile device 1202 have at this stage already been matched. It should be noted that once a match is made, the system monitors that the devices are connected using device ID expressions only as there is no need to check if User ID expressions match through the server and this could get expensive over a given period of time. Another reason why the system monitors using device IDs is to deal with use cases where one particular might have multiple devices (mobile phone, iPad and desktop) while using just one user ID for the app on each device. By matching device ID we can then understanding listening habits on each unit and provide a more comprehensive overview of musical tastes when matching preferences.

The monitoring commences when the first mobile device tries to find the next/first matched device using known device IDs 1203. Next, the first mobile device scans for the next/first device using the best location or communication discovery module for that particular situation 1204. If the device ID is matched 1205 then the process begins again and the first mobile device tries to find the next/first matched device using known device IDs 1203. If the device ID is not matched then the discovery process is commenced to search for the next device 1206 and as further described in FIG. 11.

Figure 13:
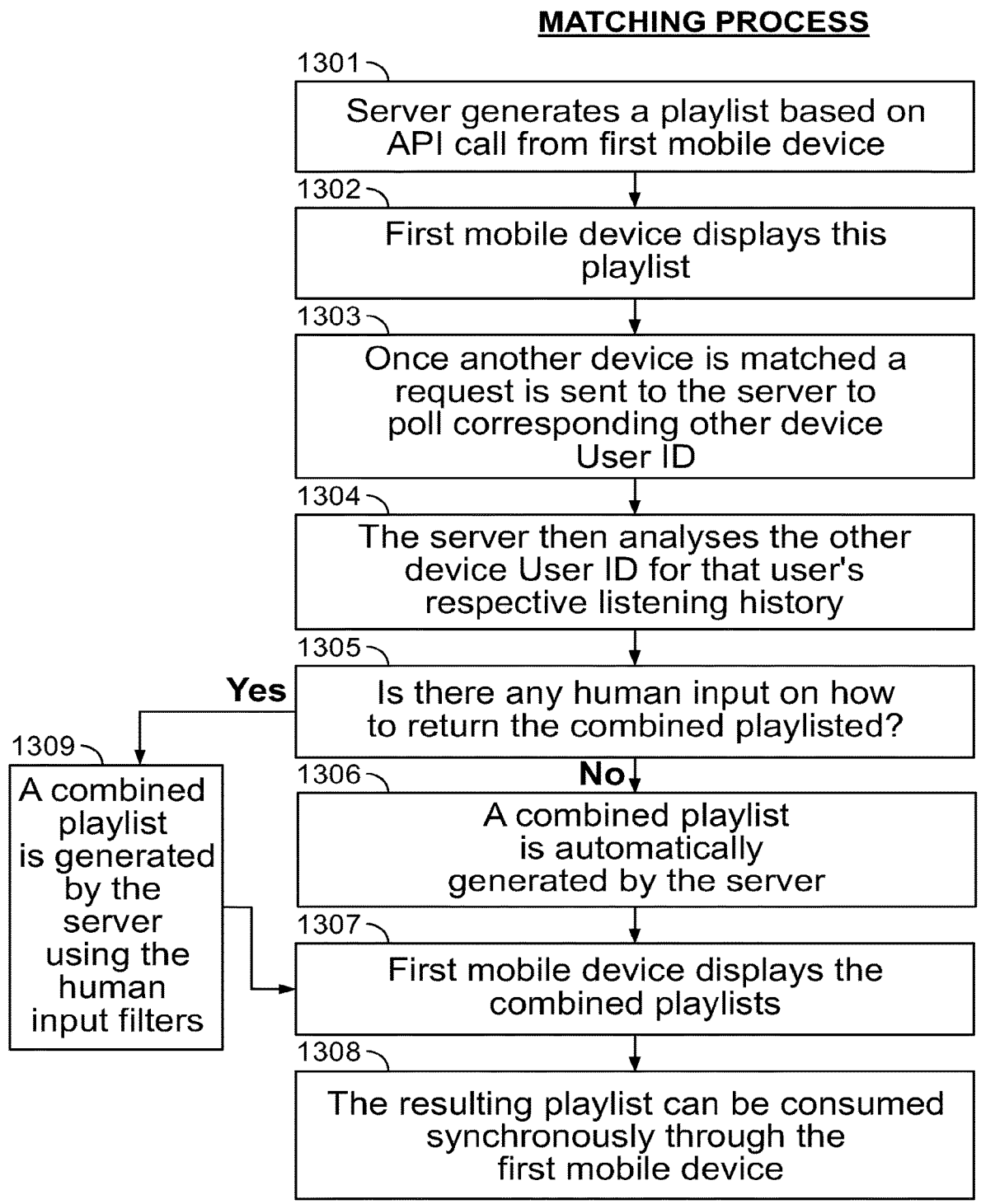
FIG. 13 is a schematic view of the matching process working.

FIG. 13 is a schematic view of the matching process working (agnostic to any particular location or communication protocol module). In the first instance, the server having identified the first mobile device, generates a playlist based on an API call from the first mobile device 1301. The first mobile device then displays this playlist 1302. Once another device is matched, a request is sent to the server to poll for other device User IDs 1303. The server then analyses the other device User ID for that user's respective listening history 1304. Then if there is any human classification into the desired outcome of the amalgamated playlist 1309 a combined playlist is generated by the server using the predetermined human input filters 1309. If no human classification is received 1305, a combined playlist is automatically generated by the server 1306. In either case, whether by generated automatically or through human input, the first mobile device then displays the combined playlists 1307 which can then be consumed synchronously through the first mobile device 1308.

Again, there is an overlap between the discovery, monitoring and matching modules between various devices at certain points in time and this is system is optimised for each particular scenario in order to match devices and to minimise the battery drain.

Figure 14:
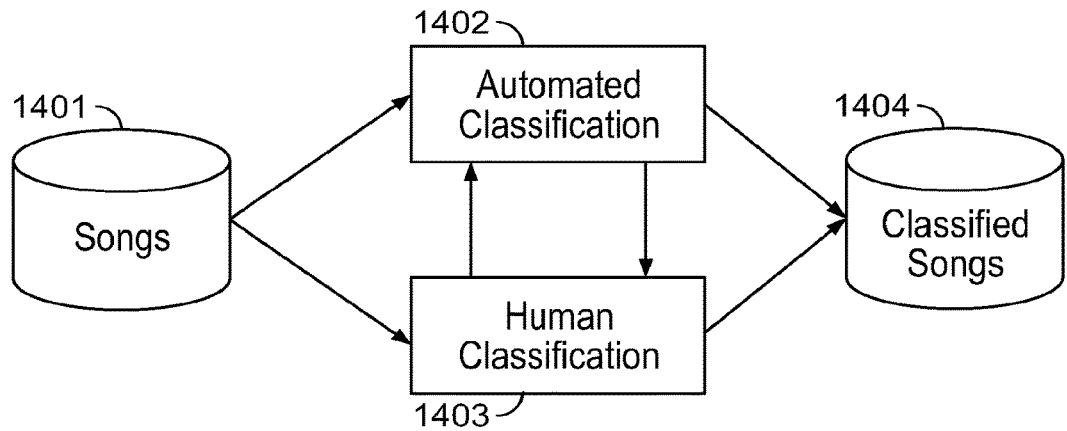
FIG. 14 is a schematic view outlining the system used for automatic classification and human classification of songs.

FIG. 14 is a schematic view outlining the classification system used in the present invention for automatic classification and human classification. For the purposes of this description, it is not elaborated on how the human classification operates but such classification systems are well recognised in the state of the art. For example, a host of the party may want to dictate that the music played suits a particular mood (e.g., pop music). By using a filter for the genre of pop music, only songs 1401 that correlate to this human classification 1403 will be added as classified songs 1404 to the dynamically generated playlist as and when people enter the room and the devices are matched due to their proximity to one another. By way of another example, a DJ at a music festival, utilising the co-presence technology, can predetermine the tempo of the songs that they wanted to include in the dynamic playlist that is generated during a set. This could be set to 120 BPM to create a more upbeat and lively atmosphere. Once this human classification 1403 has been set, only the corresponding classified songs 1404 would then be amalgamated into the dynamic playlist.

If no human classification is included then the invention uses an automatic classification system 1402 which will result in classified songs 1404 based on that method.

Figure 15:
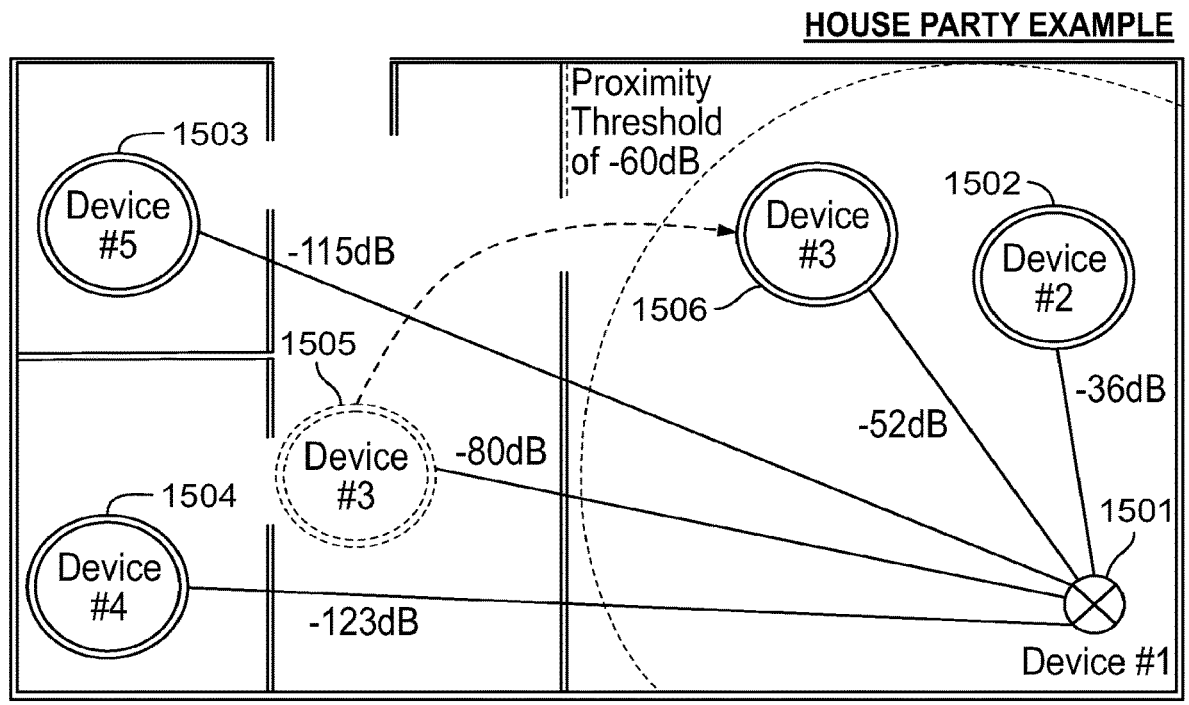
FIG. 15 is a diagram of device co-present proximity in operation at a house party to generate dynamic playlists.

FIG. 15 is a diagram of a practical example of how the present invention operates by showing the indoor floor plan of a house and the positioning of a number of devices within that house. In this case, the first mobile device 1501 is the master device which is being used to play music at a house party. In this example, we have set an arbitrary proximity range of −60 dB. Any wireless signals which transmit a frequency to the first mobile device 1501 within that set proximity are recognised as being within the necessary distance threshold from one another and matched. The second mobile device 1502 is −36 dB away from the first primary mobile device. The system then begins the matching process as set out in FIG. 13 and the playlist is dynamically generated based on the chosen classification system. The third mobile device is initially outside of the proximity range set 1505 with a reading of −80 dB. If the owner of that third mobile device then moved into the room where the music was being played, 1506 the first mobile device would recognise that this device was within range and the matching process would commence. The net effect of this change in position by the owner of the third mobile device is that once inside the room 1506, the party playlist would dynamically change based on the listening history of that person as adjusted to the classification system chosen (if any). The fourth mobile device 1504 is outside of the predetermined range with a reading of −123 dB and never moves into the room. The playlist is therefore not updated by the presence of this device. Similarly, the fifth mobile device is not within the predetermined range with a reading of −115 dB. As such, the playlist would not be updated by accounting for the listening history and tastes of the owner of that device either.

Figure 16:
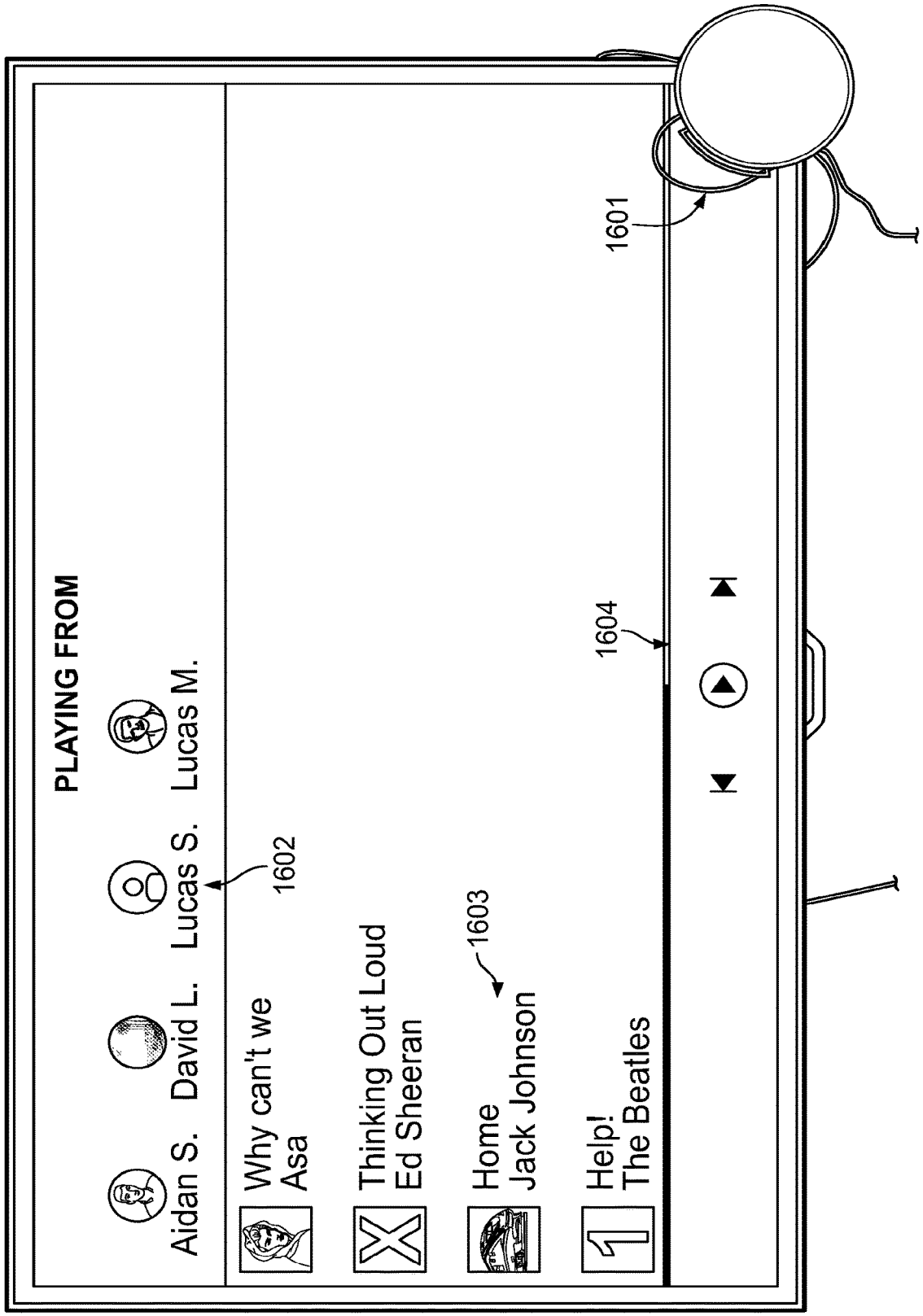
FIG. 16 is a picture of the invention working using a central media player and TV.

FIG. 16 is an example of the invention working using a Google Nexus Player as the media device and using a TV to show the playlist that is being generated dynamically. The Google Nexus Player has a wireless connection using Bluetooth 4.1 and so any devices with Bluetooth capabilities are able to communicate with the media system. First the software is installed on the Google Nexus Player 1601. The Google Nexus Player is then connected to the TV to demonstrate the media player functionality. When a new user walks into the room and their mobile device is matched 1602, they will appear on the application as a matched device. The invention looks at the listening history for each matched device and updated the playlist 1603 accordingly. As people enter and leave the room, this playlist changes dynamically. The playlist can be listened to 1604 at any stage and the songs queued in the playlist will update based on the presence of other devices in the room.

FIG. 17 is a diagram explaining how the invention can be used at a music festival. In this example, the primary media device is 1702 is controlled by a DJ who is playing his set on the main stage 1701 of the festival. A proximity threshold of −90 dB is set for wireless communications and so only devices within this range will be directly matched with the primary media device. So in this example, the second mobile device 1703, with a reading of −68 dB and the third mobile device 1704 with a reading of −72 dB, are within the proximity threshold and are therefore matched with the primary media device 1702.

In this case, the fourth mobile device 1705 with a reading of −93 dB is outside of the proximity threshold set of −90 dB from the primary media device 1702. However using the latest developments in mesh networks on the Bluetooth communication protocols, the system can indirectly connect the fourth mobile device 1705 with the primary media device 1702 through the second mobile device 1703. This is because there is a distance of −35 dB between the fourth mobile device 1705 and the second mobile device 1703 which is within the proximity threshold set. The fourth mobile device 1705 can therefore communicate (through the second mobile device 1703) with the primary media player 1702 and will the fourth mobile device 1705 be recognised as a paired device. The matching process can then commence as outlined in FIG. 13. Equally, the sixth mobile device 1707 is well outside of the proximity threshold with a reading of −128 dB from the primary media player 1702. The sixth mobile device 1707 can however communicate indirectly with the primary media player 1702 though the fourth mobile device 1705 and/or the second mobile device 1703. Similarly, using this approach the fifth mobile device 1706 and the seventh mobile device 1708 can communicate with the primary media player 1702.

The DJ can therefore update his set list based on the musical preferences of those in attendance at the music festival, not just those who might be already at the main stage and within the proximity threshold. One can imagine how the use of the Bluetooth mesh network could be used in other situations to understand what taste preferences are matched between devices that are close to one another but not directly within range of a location or communication protocol.

Thus the reader will see that at least one embodiment of the system provides a new and improved way to generate dynamic playlists utilising device co-presence proximity. Furthermore, the method and apparatus described has the additional advantages in that:

it identifies content in the most efficient manner possible using complimentary methods to ensure that the correct song is identified;

it allows for the graphing of music tastes by understanding what music a user has been listening to;

it allows for the recognition of co-present mobile devices using a number of different location and communication modules;

it allows for both an automated process and human input process when classifying what media items to include in a playlist;

it allows for such playlists to be generated in real-time and updated according to the music preferences of the matched devices that are present;

it provides a mechanism for users to then consume the songs that have been smoothed in any given playlist.

In accordance with an embodiment, an apparatus comprises at least one processor; at least one memory including computer program code, at least one memory and the computer program code configured to, with the at least one processor, cause the apparatus to perform identifying of music preferences by analysing the listening history on a device of a user.

In accordance with an embodiment, the at least one processor and the at least one memory are further configured to initiate recognition of what devices are co-present within a set proximity for the purposes of matching such devices.

In accordance with an embodiment, the at least one processor and the at least one memory are further configured to initiate classification of how the content that is matched across the matched devices is to be generated.

In accordance with an embodiment, the at least one processor and the at least one memory are further configured to generate a dynamic playlist based on the devices being co-present within a set proximity and using such a classification system as desired by a user.

In accordance with an embodiment, the apparatus is adapted to merge the media content utilising co-presence proximity between two or more electronic devices and generating a dynamic playlist for two or more devices.

In accordance with an embodiment, the improvement of matching process by adapting to the best location or communication module for each specific situation.

In accordance with an embodiment, the system optimises the matching process in order to save battery life of any matched mobile devices.

In accordance with an embodiment, a method for generating dynamic playlists utilising device co-presence proximity comprises the step of identifying of music preferences by analysing the listening history on a device of a user; and recognising what devices are co-present within a set proximity for the purposes of matching such devices.

While the above description contains many specificities, these should not be construed as limitations on the scope, but rather as an exemplification of one or several embodiments thereof. Many other variations are possible. Accordingly, the scope should be determined not by the embodiments illustrated, but by the appended claims and their legal equivalents.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g., CD-ROM, or magnetic recording medium, e.g., a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method for generating dynamic playlists utilizing device co-presence proximity, the method being performed by an apparatus having at least one processor, and at least one memory including a computer program code, the method comprising:
    obtaining a user ID associated with a first electronic device;
    without user intervention, matching electronic devices to the first electronic device based on proximity using a computer communication protocol, including matching:
        one or more second electronic devices to the first electronic device, the one or more second electronic devices being co-present within a set proximity of the first electronic device, as determined using signals transmitted from the one or more second electronic devices to the first electronic device via the computer communication protocol, wherein the set proximity of the first electronic device is defined by comparing an attenuation of a signal received by the first electronic device to a predefined attenuation threshold; and
        at least one third electronic device to the first electronic device, the at least one third electronic device being outside the set proximity of the first electronic device but is co-present within the set proximity of at least one of the second electronic devices, as determined using a signal transmitted from the at least one third electronic device to the at least one second electronic device via the computer communication protocol;
    for each respective device of the matched second electronic devices and the at least one third electronic device:
        obtaining user IDs associated with each respective device, the user IDs sent to the apparatus; and
        identifying a corresponding user's music preferences by analyzing a listening history of the respective device;
    based on the users' music preferences, including preferences of the users of the one or more second electronic devices and the at least one third electronic device, generating a dynamic playlist for the first electronic device, the one or more second electronic devices, and the at least one third electronic device; and
    providing, for playback, the dynamic playlist.

2. The method of claim 1, wherein:
    the first electronic device is a master device for the dynamic playlist; and
    the dynamic playlist is generated using a filter applied by a user of the master device.

3. The method of claim 1, further including:
    without user intervention, matching a new electronic device to the first electronic device based on proximity between the new electronic device and the first electronic device; and
    updating the dynamic playlist based on a listening history of a user associated with the new electronic device.

4. The method of claim 1, wherein the matching of the electronic devices to the first electronic device is based on at least one of Bluetooth, Global Positioning System (GPS), or a Local Area Network (LAN).

5. The method of claim 4, further including selecting between using Bluetooth, Global Positioning System (GPS), or a Local Area Network (LAN) based on a battery life of a corresponding matched device.

6. An apparatus comprising:
    at least one processor; and
    at least one memory including a computer program code, the computer program code comprising instructions for:
    obtaining a user ID associated with a first electronic device;
    without user intervention, matching electronic devices to the first electronic device based on proximity using a computer communication protocol, including matching:
        one or more second electronic devices to the first electronic device, the one or more second electronic devices being co-present within a set proximity of the first electronic device, as determined using signals transmitted from the one or more second electronic devices to the first electronic device via the computer communication protocol, wherein the set proximity of the first electronic device is defined by comparing an attenuation of a signal received by the first electronic device to a predefined attenuation threshold; and
        at least one third electronic device to the first electronic device, the at least one third electronic device being outside the set proximity of the first electronic device but is co-present within the set proximity of at least one of the second electronic devices, as determined using a signal transmitted from the at least one third electronic device to the at least one second electronic device via the computer communication protocol;
    for each respective device of the matched second electronic devices and the at least one third electronic device:
        obtaining user IDs associated with each respective device, the user IDs sent to the apparatus; and
        identifying a corresponding user's music preferences by analyzing a listening history of the respective device;
    based on the users' music preferences, including preferences of the users of the one or more second electronic devices and the at least one third electronic device, generating a dynamic playlist for the first electronic device, the one or more second electronic devices, and the at least one third electronic device; and providing, for playback, the dynamic playlist.

7. The apparatus of claim 6, wherein:
the first electronic device is a master device for the dynamic playlist; and
the dynamic playlist is generated using a filter applied by a user of the master device.

8. The apparatus of claim 6, wherein the computer program code further includes instructions for:
without user intervention, matching a new electronic device to the first electronic device based on proximity between the new electronic device and the first electronic device; and
updating the dynamic playlist based on a listening history of a user associated with the new electronic device.

9. The apparatus of claim 6, wherein the matching of the electronic devices to the first electronic device is based on at least one of Bluetooth, Global Positioning System (GPS), or a Local Area Network (LAN).

10. The apparatus of claim 9, wherein the computer code further includes instructions for selecting between using Bluetooth, Global Positioning System (GPS), or a Local Area Network (LAN) based on a battery life of a corresponding matched device.

11. A non-transitory computer-readable storage medium storing computer program code that, when executed by an apparatus having at least one processor, causes the apparatus to perform a set of operations including:
obtaining a user ID associated with a first electronic device;
without user intervention, matching electronic devices to the first electronic device based on proximity using a computer communication protocol, including matching:
one or more second electronic devices to the first electronic device, the one or more second electronic devices being co-present within a set proximity of the first electronic device, as determined using signals transmitted from the one or more second electronic devices to the first electronic device via the computer communication protocol, wherein the set proximity of the first electronic device is defined by comparing an attenuation of a signal received by the first electronic device to a predefined attenuation threshold; and
at least one third electronic device to the first electronic device, the at least one third electronic device being outside the set proximity of the first electronic device but is co-present within the set proximity of at least one of the second electronic devices, as determined using a signal transmitted from the at least one third electronic device to the at least one second electronic device via the computer communication protocol;
for each respective device of the matched second electronic devices and the at least one third electronic device:
obtaining user IDs associated with each respective device, the user IDs sent to the apparatus; and
identifying a corresponding user's music preferences by analyzing a listening history of the respective device;
based on the users' music preferences, including preferences of the users of the one or more second electronic devices and the at least one third electronic device, generating a dynamic playlist for the first electronic device, the one or more second electronic devices, and the at least one third electronic device; and
providing, for playback, the dynamic playlist.

12. The non-transitory computer-readable storage medium of claim 11, wherein:
the first electronic device is a master device for the dynamic playlist; and
the dynamic playlist is generated using a filter applied by a user of the master device.

13. The non-transitory computer-readable storage medium of claim 11, wherein the computer program code further includes instructions for:
without user intervention, matching a new electronic device to the first electronic device based on proximity between the new electronic device and the first electronic device; and
updating the dynamic playlist based on a listening history of a user associated with the new electronic device.

14. The non-transitory computer-readable storage medium of claim 11, wherein the matching of the electronic devices to the first electronic device is based on at least one of Bluetooth, Global Positioning System (GPS), or a Local Area Network (LAN).

15. The non-transitory computer-readable storage medium of claim 14, wherein the computer code further includes instructions for selecting between using Bluetooth, Global Positioning System (GPS), or a Local Area Network (LAN) based on a battery life of a corresponding matched device.

* * * * *